(12) United States Patent
Ji et al.

(10) Patent No.: US 9,596,633 B2
(45) Date of Patent: Mar. 14, 2017

(54) ADAPTIVE NEIGHBORING CELL MEASUREMENT SCALING FOR WIRELESS DEVICES

(71) Applicant: Apple Inc., Cupertino, CA (US)

(72) Inventors: Zhu Ji, San Jose, CA (US); Johnson O. Sebeni, Fremont, CA (US); Xiantao Sun, Sunnyvale, CA (US); Yu-Lin Wang, Fremont, CA (US)

(73) Assignee: Apple Inc., Cupertino, CA (US)

( * ) Notice: Subject to any disclaimer, the term of this patent is extended or adjusted under 35 U.S.C. 154(b) by 467 days.

(21) Appl. No.: 14/135,671

(22) Filed: Dec. 20, 2013

(65) Prior Publication Data

US 2014/0185475 A1    Jul. 3, 2014

Related U.S. Application Data

(60) Provisional application No. 61/746,172, filed on Dec. 27, 2012.

(51) Int. Cl.
*H04W 36/00* (2009.01)
*H04W 76/04* (2009.01)
*H04W 68/02* (2009.01)

(52) U.S. Cl.
CPC ........ *H04W 36/0088* (2013.01); *H04W 68/02* (2013.01); *H04W 76/048* (2013.01)

(58) Field of Classification Search
None
See application file for complete search history.

(56) References Cited

U.S. PATENT DOCUMENTS

| 6,553,228 B1* | 4/2003 | Kotzin | H04W 68/00 455/415 |
| 8,554,212 B1 | 10/2013 | Rai et al. | |
| 2007/0259699 A1* | 11/2007 | Homchaudhuri | H04W 52/0216 455/574 |
| 2008/0170526 A1* | 7/2008 | Narang | H04W 52/0216 370/311 |
| 2008/0285494 A1* | 11/2008 | Shin | H04W 52/0229 370/311 |
| 2009/0047958 A1 | 2/2009 | Rimhagen et al. | |
| 2010/0272004 A1* | 10/2010 | Maeda | H04L 5/0007 370/312 |

(Continued)

*Primary Examiner* — Gregory Sefcheck
*Assistant Examiner* — Jenkey Van
(74) *Attorney, Agent, or Firm* — Meyertons Hood Kivlin Kowert & Goetzel, P.C.; Jeffrey C. Hood

(57) ABSTRACT

Adaptive neighboring cell measurement scaling by a wireless user equipment (UE) device. The UE may operate alternately in active and inactive states in a periodic manner according to DRX cycle timing for each of a plurality of DRX cycles. Paging messages may be checked for while in the active state during each DRX cycle. If a paging message is received, it may be decoded using a joint detection technique. The UE may adaptively determine whether or not to perform neighboring cell measurements during at least a subset of the DRX cycles, and perform neighboring cell measurements according to the adaptive determination. The adaptive determination may be based on one or more of joint detection of paging messages, one or more previous cell measurements, or an amount of motion of the UE.

19 Claims, 7 Drawing Sheets

(56) References Cited

U.S. PATENT DOCUMENTS

| | | | |
|---|---|---|---|
| 2011/0053603 A1* | 3/2011 | Luo | H04L 5/0007 |
| | | | 455/450 |
| 2011/0269449 A1* | 11/2011 | Kazmi | H04B 7/024 |
| | | | 455/422.1 |
| 2012/0015653 A1* | 1/2012 | Paliwal | H04W 24/10 |
| | | | 455/435.1 |
| 2012/0093093 A1* | 4/2012 | Frenger | H04B 7/0452 |
| | | | 370/329 |
| 2012/0252368 A1* | 10/2012 | Edara | H04W 24/10 |
| | | | 455/67.11 |
| 2013/0095829 A1* | 4/2013 | Bhattad | H04B 1/7107 |
| | | | 455/434 |
| 2013/0267221 A1 | 10/2013 | Srinivasan et al. | |
| 2014/0348020 A1* | 11/2014 | Tenny | H04W 68/00 |
| | | | 370/252 |

\* cited by examiner

| DRX Cycle Length [s] | $N_{serv}$ (number of DRX cycles) | $T_{measureNTDD}$ [s] (number of DRX cycles) | $T_{evaluateNTDD}$ [s] (number of DRX cycles) | $T_{measureTDD}$ [s] (number of DRX cycles) | $T_{evaluateTDD}$ [s] (number of DRX cycles) | $T_{measureFDD}$ [s] (number of DRX cycles) | $T_{evaluateFDD}$ [s] (number of DRX cycles) | $T_{measureGSM}$ [s] (number of DRX cycles) |
|---|---|---|---|---|---|---|---|---|
| 0.08 | 4 | 0.64 (8 DRX cycles) | 2.56 (32 DRX cycles) | 0.64 (8 DRX cycles) | 2.56 (32 DRX cycles) | 0.64 (8 DRX cycles) | 2.56 (32 DRX cycles) | 2.56 (32 DRX cycles) |
| 0.16 | 4 | 0.64 (4) | 2.56 (16) | 0.64 (4) | 2.56 (16) | 0.64 (4) | 2.56 (16) | 2.56 (16) |
| 0.32 | 4 | 1.28 (4) | 5.12 (16) | 1.28 (4) | 5.12 (16) | 1.28 (4) | 5.12 (16) | 5.12 (16) |
| 0.64 | 4 | 1.28 (2) | 5.12 (8) | 1.28 (2) | 5.12 (8) | 1.28 (2) | 5.12 (8) | 5.12 (8) |
| 1.28 | 2 | 1.28 (1) | 6.4 (5) | 1.28 (1) | 6.4 (5) | 1.28 (1) | 6.4 (5) | 6.4 (5) |
| 2.56 | 2 | 2.56 (1) | 7.68 (3) | 2.56 (1) | 7.68 (3) | 2.56 (1) | 7.68 (3) | 7.68 (3) |
| 5.12 | 1 | 5.12 (1) | 10.24 (2) | 5.12 (1) | 10.24 (2) | 5.12 (1) | 10.24 (2) | 10.24 (2) |

FIG. 8

ADAPTIVE NEIGHBORING CELL MEASUREMENT SCALING FOR WIRELESS DEVICES

PRIORITY CLAIM

The present application claims benefit of priority to U.S. Provisional Application No. 61/746,172 titled "Adaptive Neighboring Cell Measurement Scaling" and filed on Dec. 27, 2012, whose inventors are Zhu Ji, Johnson O Sebeni, Xiantao Sun, and Yu-Lin Wang, which is hereby incorporated by reference in its entirety as though fully and completely set forth herein.

FIELD

The present application relates to wireless devices, and more particularly to a system and method for adaptive neighboring cell measurement and evaluation scaling by a wireless device.

DESCRIPTION OF THE RELATED ART

Wireless communication systems are rapidly growing in usage. Further, wireless communication technology has evolved from voice-only communications to also include the transmission of data, such as Internet and multimedia content. Many wireless communication technologies, such as cellular communication technologies, are substantially designed to provide mobile communication capabilities to wireless devices, such as cellular phones. Users of such wireless devices may be able to move freely within a service territory of their service provider while using their wireless devices, and the wireless devices may operate in conjunction with the service provider in a manner that accounts for such movement.

For example, if a cellular phone is experiencing degraded signal strength or quality, a common cause is movement of the cell phone (e.g., a user of the cell phone may be carrying the cell phone while moving) which results in lower signal strength or quality from the serving cell as the user moves away from the serving cell's base station. As a result, some wireless communication technologies require that a wireless device perform various signal strength and/or quality measurements on neighboring cells under certain conditions (e.g., detecting degraded signal strength or quality of the serving cell) and/or according to certain timelines, e.g., in case cell re-selection to one of the neighboring cells would provide improved service.

However, performing such measurements generally does consume power and decrease the battery life of the wireless device. In particular, in a device which utilizes an idle-mode discontinuous reception (DRX) technique (which may be commonly implemented among many cellular communication technologies), a significant portion of the time the device remains awake during each DRX cycle may be used to perform such measurements and evaluations. Thus, for such a device, the effectiveness and efficiency of neighboring cell measurements and evaluations may have a significant effect on device battery life (and device standby time in particular). Further, the potential impact of neighboring cell measurements on battery life may be amplified in cellular communication technologies which utilize a relatively high density of cells, as in such a case a device might be within range of greater number of neighboring cells. For example, some cellular communication technologies which utilize time-division multiple access (TDMA) may support a greater density of cells, and devices which operate according to such technologies may often see a relatively large number of neighboring cells.

Accordingly, determining how to effectively and efficiently measure and evaluation neighboring cells, in light of device performance concerns and concerns regarding power consumption and battery life of the wireless device, is a difficult problem, particularly in systems which deploy a relatively high cell density. Accordingly, improvements in wireless communication systems would be desirable.

SUMMARY

In light of the foregoing and other concerns, it would be desirable to provide a way for wireless devices to adaptively perform neighboring cell measurements in a manner that appropriately balances power consumption and battery concerns with device performance. In particular, in systems with a relatively high cell density (e.g., systems in which a wireless device may have a large number of neighboring cells at least in some areas), it may be desirable to provide a way to adaptively modify the frequency at which cell measurements are performed for at least a subset of a wireless device's neighboring cells. Further, the wireless device could intelligently determine to which subset(s) of the neighboring cells to assign a given neighboring cell, and how to scale each subset of the neighboring cells, in an intelligent manner based on actual conditions (e.g., channel conditions, user movement, etc.) experienced by the wireless device.

As an example, consider a time-division multiple access system such as Time-Division Synchronous Code Division Multiple Access (TD-SCDMA). Such systems commonly utilize short spreading codes and time-synchronous communications, which may in turn allow joint detection algorithms to be applied with reasonable complexity. Since joint detection algorithms may significantly reduce or eliminate multiple access interference (MAI) and thus increase system capacity, such systems may significantly increase overall system capacity. In particular, with such an effective ability to cancel interference, it may be possible to obtain a high cell density. Accordingly, such systems may be very useful in areas of high population densities (e.g., high-density cities/urban areas).

However, with a higher cell density comes the potential that a wireless device may see a greater number of neighboring cells. If the wireless device were to frequently perform measurements on all available neighboring cells, this might demand significant power consumption. However, even though a large number of neighboring cells may be available, it may be the case that at least some of the time relatively few of those neighboring cells may actually need to be frequently monitored. Accordingly, utilizing a technique for adaptively scaling neighboring cell measurements may enable a wireless device in such a system to advantageously reduce its battery consumption by reducing the frequency at which less-relevant neighboring cells are measured, without sacrificing device performance (e.g., since more-relevant neighboring cells may still be measured at their usual frequency). Such a technique could alternatively or additionally improve device performance (with minimal additional battery life cost) by selectively increasing the frequency at which more-relevant neighboring cells are measured in high-leverage situations (e.g., situations in which the likelihood that cell re-selection would be desirable is relatively high).

A wireless device in such a system might use any of a variety of techniques and/or parameters to determine how to adaptively scale neighboring cell measurements. For example, based on previous or current neighboring cell measurements, joint-detection reception, and/or movement (or lack thereof), the device might assign various neighboring cells to one or more groups/subsets of neighboring cells. The device might then scale the frequency at which subsequent measurements are performed on each group of neighboring cells. The scaling factor for each group may depend, in turn, on the perceived likelihood that cells in each group may become relevant (e.g., for cell re-selection); thus, as one exemplary basis for scaling, measurements on groups of cells which exhibit weaker signal strength and/or signal quality might be scaled such as to be performed less frequently than measurements on groups of cells which exhibit stronger signal strength and/or signal quality. Numerous other bases for adaptive neighboring cell measurement scaling may also or alternatively be used, including combinations of numerous criteria according to various circumstances, as desired. Further, note that while the above example illustrates the potential benefit of adaptive scaling of neighboring cell measurements in a TDMA cellular system such as TD-SCDMA, similar and/or other benefits may also potentially be derived from such techniques in other TDMA cellular systems such as TD-LTE and TD-LTE-Advanced, as well as in other (e.g., non-TDMA) cellular systems such as W-CDMA, CDMA2000, and FD-LTE (among others).

Accordingly, embodiments are presented herein of such a method for a wireless user equipment (UE) device to adaptively scale neighboring cell measurements and a UE configured to implement the method. The UE may include one or more radios, including one or more antennas, for performing wireless communications with base stations (BSs). The UE may also include device logic (which may include a processor and memory medium and/or hardware logic) configured to implement the method. Embodiments are also presented of a memory medium (e.g., a non-transitory computer accessible memory medium) storing program instructions executable by a processor to perform part or all of the method.

BRIEF DESCRIPTION OF THE DRAWINGS

A better understanding of the present subject matter can be obtained when the following detailed description of the embodiments is considered in conjunction with the following drawings, in which:

FIG. 8 is a table illustrating exemplary neighboring cell measurement and evaluation timing guidelines in a TD-SCDMA Idle DRX context.

Figure 1:
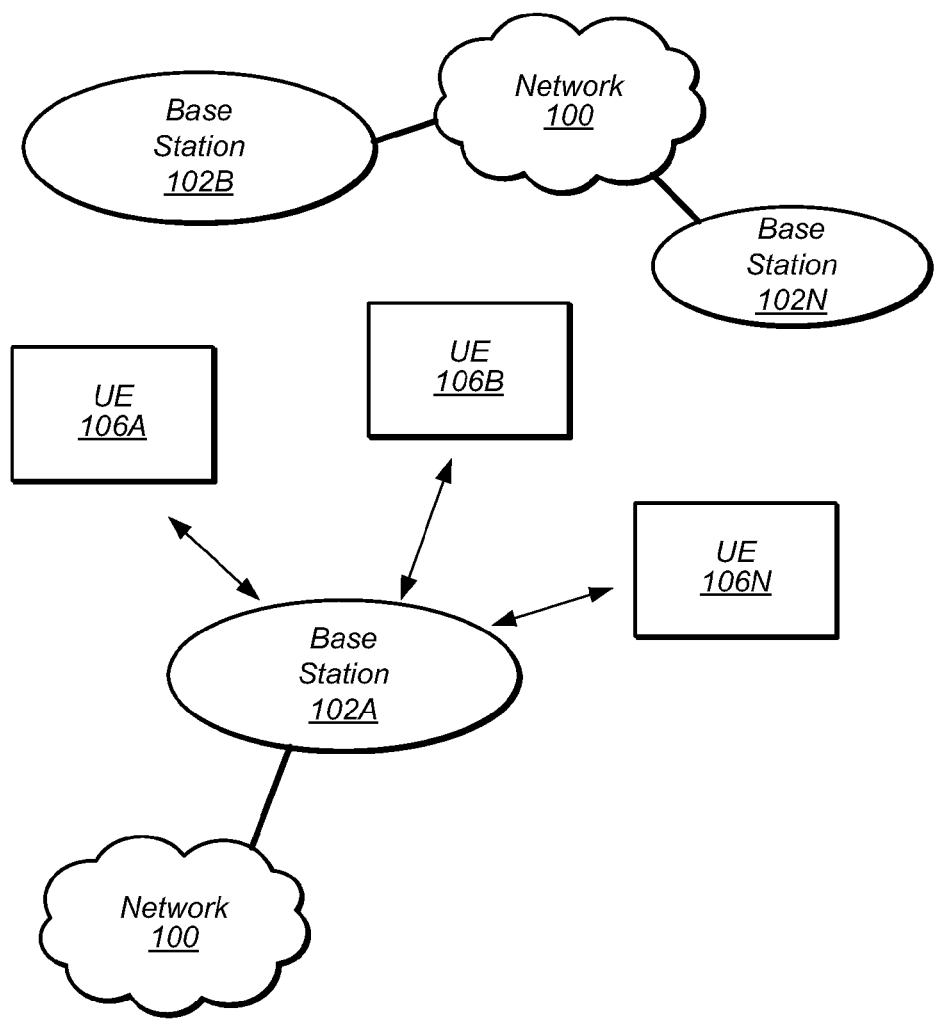
FIG. 1 illustrates an exemplary (and simplified) wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in this disclosure:
UE: User Equipment
BS: Base Station
GSM: Global System for Mobile Communication
UMTS: Universal Mobile Telecommunication System
LTE: Long Term Evolution
TD-SCDMA: Time-Division Synchronous Code Division Multiple Access
TD-LTE: Time-Division LTE
FD-LTE: Frequency-Division LTE Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DSTM, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
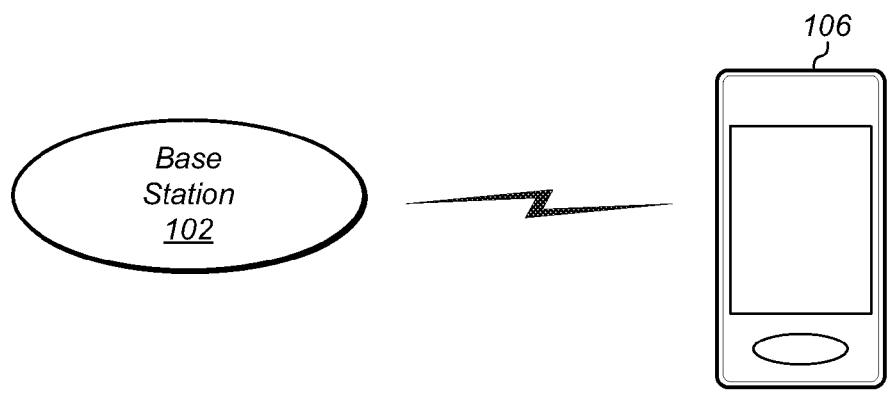
FIG. 2 illustrates a base station (BS) in communication with a user equipment (UE) device.

FIGS. 1 and 2—Communication System

FIG. 1 illustrates an exemplary (and simplified) wireless communication system. It is noted that the system of FIG. 1 is merely one example of a possible system, and embodiments of the invention may be implemented in any of various systems, as desired.

As shown, the exemplary wireless communication system includes a base station 102A which communicates over a transmission medium with one or more user devices 106A, 102B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS (WCDMA), TD-SCDMA, CDMA2000, WiMAX, LTE (including TD-LTE and/or FD-LTE), LTE-A (including TD-LTE-A and/or FD-LTE-A), WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N). The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple radio access technologies/wireless communication protocols. For example, the UE 106 may be configured to communicate using two or more of TD-SCDMA, LTE, LTE-A, WLAN/Wi-Fi, or GNSS. Other combinations of wireless communication technologies are also possible.

The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further alternative, the UE 106 may include one or more radios which are shared between multiple wireless communication protocols, and one or more radios which are used exclusively by a single wireless communication protocol. Other configurations are also possible.

Figure 3:
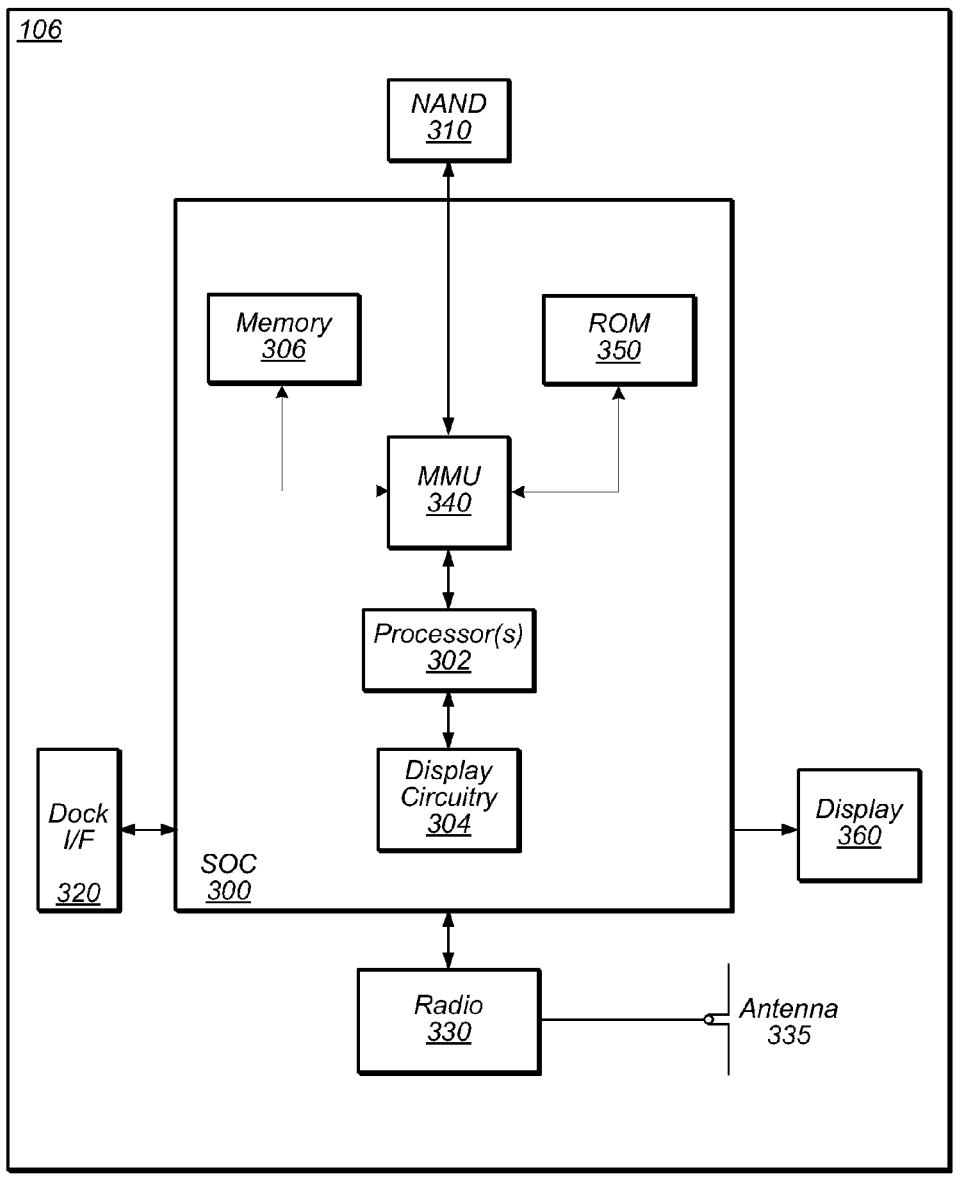
FIG. 3 illustrates an exemplary block diagram of a UE.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for TD-SCDMA, LTE, Wi-Fi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

As described further subsequently herein, the UE 106 may include hardware and software components for implementing features for adaptively scaling neighboring cell measurements and/or evaluations, such as those described herein with reference to, inter alia, FIG. 5. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 5.

Figure 4:
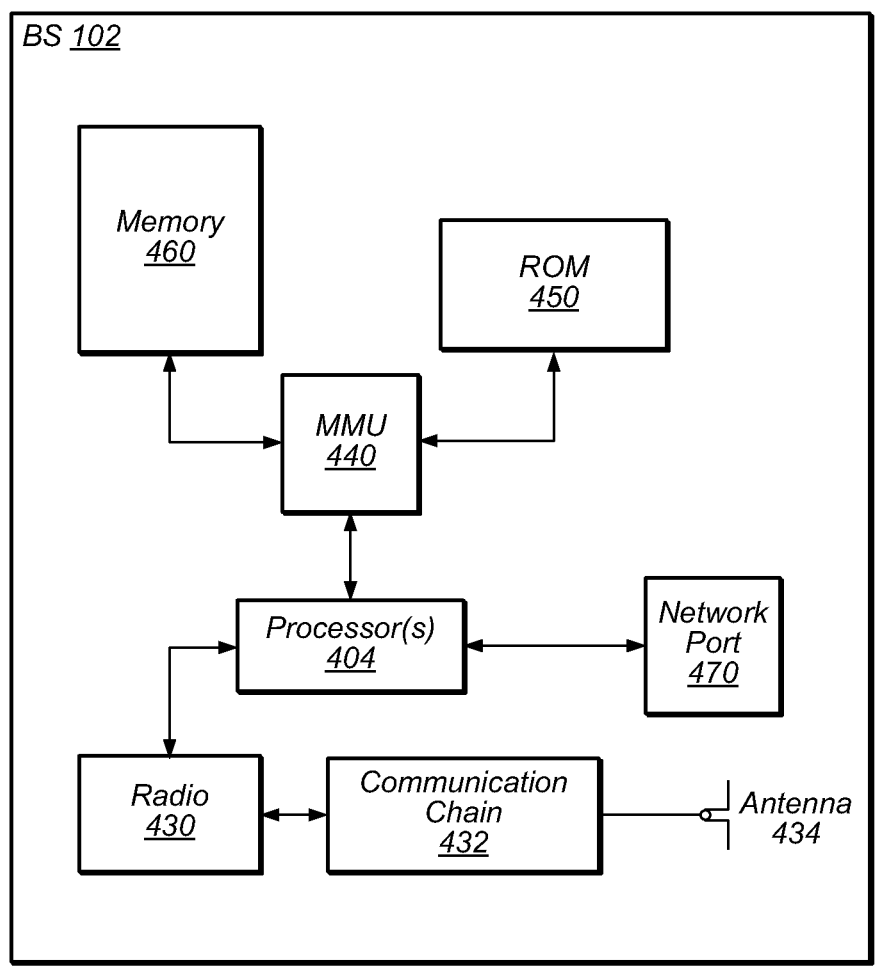
FIG. 4 illustrates an exemplary block diagram of a BS.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, TD-SCDMA, WCDMA, CDMA2000, etc.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

Figure 5:
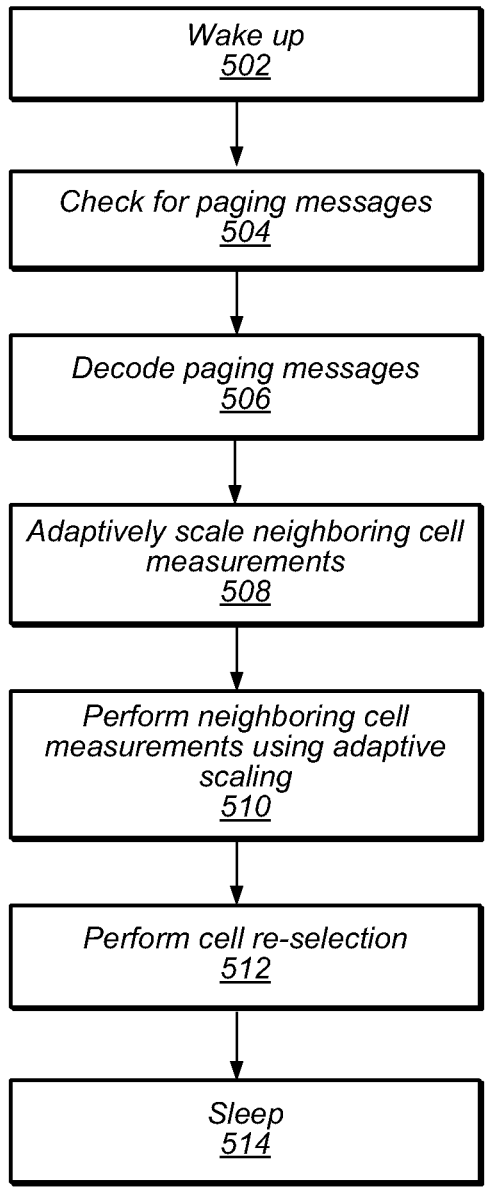
FIG. 5 is a flowchart diagram illustrating an exemplary method for a UE to adaptively scale neighboring cell measurements.

FIGS. 5—Flowchart

In order to perform cellular communications, a wireless UE device 106 may select a first cell on which to camp. The first cell may operate according to a cellular technology such as GSM, TD-SCDMA, W-CDMA, LTE, CDMA2000 (1xRTT, 1xEV-DO), etc. The first cell may be provided by a base station 102 and may provide a connection to a core network, e.g., of a cellular service provider, with which a user of the UE 106 may have a subscription and/or other agreement to provide cellular service. The base station 102 may operate in conjunction with numerous other base stations (which may provide other cells) and other network hardware and software to provide continuous (or nearly continuous) overlapping wireless service over a wide geographic area.

The first cell may be selected from among one or more cells within wireless communication range of the UE 106, which may be provided by nearby base stations. The UE 106 may be capable of discovering, detecting signals from, and possibly communicating with some or all of these neighboring cells, e.g., depending on signal strength/quality, permission, technological interoperability, etc. The first cell may be selected from the cells within wireless communication range of the UE 106 on the basis of one or more signal strength and/or signal quality measurements of the first cell and/or other nearby cells, among other possible criteria (e.g., wireless traffic congestion of the cell(s), operator of the cell(s), wireless technology according to which the cell(s) operate, etc.).

The first cell may be selected as an initial cell selection, e.g., upon powering on the UE 106 (or possibly after powering on a radio of the UE 106, e.g., upon exiting a limited-operation or "airplane mode"), according to some embodiments. Alternatively, the first cell may be selected as part of a cell re-selection procedure. For example, according to some embodiments, the UE 106 may perform a cell re-selection procedure to select a new cell (e.g., the first cell) with better signal strength and/or quality based on experiencing degraded signal strength and/or quality on a previous serving cell, e.g., as a result of moving from a service area of the previous serving cell to a service area of the first cell.

Wireless devices which are capable of utilizing cellular communication may be designed to communicate with cells according to multiple modes of operation. For example, many wireless devices may be capable of operating in an idle-mode or a connected-mode. The idle-mode may be used to conserve battery during substantially inactive periods, while at least periodically checking for messages or indications (e.g., paging messages) that a more active connection would be appropriate. The connected mode may be used for active communication between a cell and a wireless device.

Thus the UE 106 may at times camp on the first cell in an idle-mode. The first cell may serve the UE 106 and provide a connection (e.g., a passive connection, in the idle-mode) to the core network. The nature of idle-mode operation for a UE 106 may vary according to different wireless communication technologies. Generally, the idle-mode operation may be appropriate when a UE 106 is not actively exchanging data (e.g., as part of a call or a networking application such as a web browser) with the network. In many cases the idle-mode may include a discontinuous reception or "DRX" mode.

A wireless device which operates using DRX may alternate between operation in an active ("waking") state and an inactive ("sleeping") state. For example, the device may "wakeup" (e.g., transition to the active/waking state) at a certain point (a "wakeup time", which may correspond to a paging opportunity for the device) during each DRX cycle, which may be scheduled by the network. Once active, the device may perform various operations, after which the device may again "go to sleep" (e.g., transition to the inactive/sleeping state). The device may then remain in the inactive/sleeping state until the next scheduled wakeup time. Thus, each "DRX cycle" may include an active portion and an inactive portion. A device which utilizes idle-mode DRX may repeat such a pattern of periodic alternating activity and inactivity over the course of numerous DRX cycles, e.g., until idle-mode operation is interrupted (such as by a transition to connected-mode, or if the device's cellular radio is powered off altogether).

Thus, in the DRX mode, the UE 106 may generally be inactive (e.g., with one or more components, such as radio and/or baseband components, powered down or sleeping) except for a window of activity during each DRX cycle. The active portion of a DRX cycle may be scheduled in a regular periodic manner; for example, many networks schedule the active portion of DRX cycles to occur at 1.28s intervals, or at some multiple of 1.28s (e.g., 2.56s, 5.12s, etc). Other values for DRX periodicity may be used as desired.

During the active portion of a DRX cycle, the UE 106 may perform certain actions (e.g., according to the configuration of the UE 106 and/or according to configuration information received from the network).

The actual operations performed by devices during the active portion of a DRX cycle may vary according to different cellular technologies, according to different implementations of similar cellular technologies (e.g., different devices and/or different networks which implement the same cellular technology but with different parameters due to different hardware, software, and/or for a variety of other possible reasons), and even between different DRX cycles in a given device. For example, some operations may be performed during every DRX cycle, while other operations may be performed less frequently.

For example, the UE 106 may monitor a paging channel for incoming voice calls or data during the active portion of the DRX cycle. In addition, the UE 106 may be configured to perform one or more cell re-selection related procedures, such as one or more neighboring cell measurements, during the active portion of at least some DRX cycles.

Note that since use of idle-mode may often correspond to periods of relatively inactive use of the UE 106 (e.g., by a user of the UE 106), it may be common that other potentially power consuming elements of the UE 106 may be powered-down at these times. For example, if a user is not actively using the UE 106 for some other application (e.g., which might not utilize cellular communication), it may be common that an application processor of the UE 106 might be powered down while the radio/baseband components may maintain limited connectivity and functionality in the idle-mode. Thus for many UEs 106, the power consumption of the baseband portion of a UE 106 during idle-mode may provide the most substantial influence on the total standby battery life of the UE 106.

Accordingly, it may be highly desirable to optimize the use of device resources during the waking periods of each idle-mode DRX cycle. As described further subsequently herein, one way of potentially improving the efficiency of device resource use in a UE 106 during idle-mode DRX may be to adaptively scale neighboring cell measurements in a manner that intelligently addresses possible trade-offs between performance and battery life.

FIG. 5 is a flowchart diagram illustrating such a method for a UE 106 to adaptively scale neighboring cell measurements. The method may be implemented as part of idle-mode DRX operation of the UE 106. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, the UE 106 may wake up. As noted above, the method may be implemented as part of idle-mode DRX operation of the UE. Thus in 502, the UE 106 may transition from the sleeping or inactive portion of the DRX operation to the waking or active portion of the DRX operation.

In 504, the UE 106 may check for paging messages. For example, the UE 106 may monitor a communication channel intended for communicating paging messages, such as a paging indication channel (PICH)/paging channel (PCH)/paging control channel (PCCH), etc. The nature of the paging channel may depend on the cellular technology used by the UE 106 and the base station 102 which provides the first cell, among various factors.

In 506, if there are any paging messages, the UE 106 may decode the paging message(s). Any of various techniques may be used in decoding the paging message(s), e.g., depending on the cellular technology used by the UE 106 and the base station 102 which provides the first cell, among various factors. As one example, the UE 106 might utilize a joint detection (also referred to as multi-user detection) technique or algorithm as part of decoding the paging message(s).

Numerous types of joint detection algorithms exist. In general, joint detection may include extracting all CDMA signals in a received signal simultaneously, e.g., through parallel processing of individual traffic streams. Using the specific spreading codes of those portions of the received signal which are not intended for the UE 106, the UE 106 may be able to eliminate or at least significantly reduce multiple access interference (MAI) in the received signal, and so may effectively see a higher signal to noise ration (SNR) on the portion of the signal which is intended for the UE 106.

Note that while joint detection may be highly effective at reducing MAI and thus may significantly increase system capacity, it may also be a relatively computationally intensive technique. Accordingly, it may be implemented more commonly in systems which specify shorter spreading codes and fewer users per signal (e.g., which may reduce the complexity and thus computational requirements of implementing joint detection). Many technologies which utilize both code-division multiple access (CDMA) and time-division multiple access (TDMA), such as TD-SCMA and TD-LTE, may fit this description.

It is worthwhile to further note that systems which utilize TDMA and CDMA (in particular those that implement joint detection) may lend themselves particularly well to implementations with high cell densities. For example, since short spreading codes and the use of joint detection in such systems may enable UEs 106 to effectively cancel a relatively large amount of interference, a high density of such cells may effectively be deployed to provide excellent service to a large number of users even in a relatively compact area without causing excessive interference to those users. Furthermore, in synchronous systems such as TD-SCDMA, the effectiveness of a high-cell-density implementation may further be supported by the synchronous nature of the system.

Note that if there is no paging message for the UE 106 in a particular DRX cycle, the UE 106 may not decode any paging messages in that DRX cycle. However, the UE 106 may also or alternatively receive and possibly decode other information from its serving cell during the active portion of some or all DRX cycles. For example, the serving cell may initially and/or periodically provide system configuration information, such as might be provided in a system information block (SIB) message, which may facilitate the ability of the UE 106 to initially attach to a serving cell and camp on that (or another) serving cell on an ongoing basis.

In 508, the UE 106 may adaptively scale its neighboring cell measurements. As noted above, at least in some cases, the amount of time spent and power consumed by a UE 106 in the active portion of idle-mode DRX cycles may substantially determine the potential standby battery life of the UE 106. Accordingly, techniques which significantly reduce the amount of time spent (and thus power consumed) in the waking portions of a UE's DRX cycles without significantly negatively affecting device performance may be highly desirable. One such technique may include adaptively scaling neighboring cell measurements.

Neighboring cell measurements (e.g., signal strength/quality, etc.) and evaluation (e.g., ranking) may be an important mobility-supporting feature of a UE 106. In particular, in order to support continuous and high-quality cellular service under mobile and otherwise changing RF conditions, it may be highly desirable for the UE 106 to occasionally perform serving cell measurements and at least some neighboring cell measurements, to evaluate the available cells, and to determine whether or not to re-select to a new cell (and if so, to which cell to re-select). It may be common that a list or group of such neighboring cells to monitor (measure/evaluate) may be provided to the UE 106 by its serving cell. Alternatively, or in addition, the UE 106 may determine which neighboring cells to monitor by other means, e.g., independently of the serving cell. The neighboring cell measurements may include any or all of intra-frequency cell measurements, inter-frequency cell measurements, inter radio access technology (IRAT) cell measurements, etc.

However, it may frequently be the case that not all neighboring cells of a UE 106 may have equal relevance to the UE 106. For example, when conditions change such that cell re-selection becomes desirable, it may be more likely that the best choice for cell re-selection may be a cell which has recently exhibited relatively high signal strength, SNR, and/or other characteristics indicative of a cell which will likely provide good quality service. It might thus be desirable to maintain a relatively frequent measurement schedule for such relatively strong cells, so that recent measurements are available for those cells most likely to be re-selected to. In contrast, it may be preferable to scale down (i.e., less frequently perform) cell measurements on neighboring cells which have relatively weak signal strength, low SNR, and/or other characteristics indicative of a cell which is unlikely to provide good quality service. Since such cells may be less likely candidates for cell re-selection, at least in the near future, reducing the frequency at which measurements of these cells are performed may beneficially reduce the amount of waking time spent by the UE 106 in idle-mode DRX, with a potentially negligible effect on device performance. Occasional measurements of such cells may still be desirable, however, as such cells could become stronger, and thus more relevant, at some point in the future.

Note that numerous possible considerations and characteristics may be used as a basis for adaptively scaling neighboring cell measurements at any given time.

As a first example of a possible consideration, the signal strength (e.g., received signal code power (RSCP), reference signal received power (RSRP), Ec/Io, or any of various other indicators of signal strength, according to various possible cellular technologies), SNR, and/or any of various other characteristics of the serving cell, either alone or in combination with other factors, could be a consideration in determining whether or not to adaptively scale any neighboring cell measurements. For example, the rate (frequency) at which neighboring cell measurements are performed might be adaptively decreased (i.e., measurements might be performed less frequently/scaled down) if conditions indicate that the serving cell is sufficiently strong that imminent cell re-selection is unlikely to be necessary. Conditions might be considered to indicate that the serving cell is sufficiently strong that imminent cell re-selection is unlikely to be necessary, among various possible reasons, if the signal strength and/or SNR of the serving cell is sufficiently strong (e.g., higher than a predetermined signal strength threshold and/or SNR threshold), and/or if there is a sufficiently large difference (e.g., larger than a predetermined delta threshold) between the signal strength and/or SNR of the serving cell and the next strongest neighboring cell.

As a further example of a possible consideration, the signal strength, SNR, and/or any of various other characteristics of the neighboring cells themselves, either alone or in combination with other factors, could be a consideration in determining whether or not to adaptively scale any neighboring cell measurements. For example, on an individual basis (or in subsets, e.g., grouped based on common ranges of characteristic values, or on other bases), neighboring cells could be evaluated for signal strength, SNR, etc., in order to determine a scaling factor (e.g., a rate at which cell measurements are performed/a proportion of DRX cycles in which to perform cell measurements) for future measurements of those cells (e.g., individually and/or according to cell groupings). Such evaluation could be performed on an absolute scale (e.g., cell characteristic values might be compared to one or more predetermined thresholds) and/or relative (e.g., cell characteristic values might be compared to comparable cell characteristic values of the serving cell and/or other neighboring cells), as desired.

Note that characteristics of cells which may be used in adaptively determining whether or not and to what degree to scale neighboring cell measurements may be obtained in any of multiple possible ways. Previous serving and neighboring cell measurements (e.g., measurements performed during previous DRX cycles) may be one such possible means of obtaining such characteristics; for example, a most recent measurement, or an average of two or more recent measurements, of each relevant (e.g., according to the desired implementation) characteristic for a given cell might be used as criteria for determining a scaling factor for current and/or future cell measurements on that cell (and/or other cells).

Another possible means of obtaining such characteristics might include joint detection algorithms. For example, if a paging message is received and decoded by the UE 106, the UE 106 may be able to detect at least some neighboring cells and gain a quantitative understanding of such cells based on the joint detection algorithm used to decode the paging message. Such a quantitative understanding might potentially include aspects of signal strength, interference levels, SNRs, etc of the detected cells. Thus, characteristics of cells obtained via a joint detection technique may be used as a basis for adaptively scaling neighboring cell measurements if desired. Note that in this case, it may be possible to adaptively determine neighboring cell measurement scaling factor(s) in a given DRX cycle based on cell characteristics obtained in that same DRX cycle.

As a still further example of a possible consideration, a level or amount of motion experienced (and/or detected) by the UE 106, either alone or in combination with other factors, could be a consideration in determining whether or not to adaptively scale any neighboring cell measurements. Thus, if the UE 106 is provided with a mechanism for detecting its own motion or lack thereof (e.g., via Doppler estimation from downlink pilot signals, GPS functionality, motion sensors, detection of a "home" Wi-Fi network or other preferred substantially localized network, detection of a type of wired connection which may be considered indicative of stationary conditions, and/or other hardware and/or software functionality of the device) or receives user input indicating that the UE 106 is "substantially stationary" or "substantially in motion", the UE 106 may be able to adaptively scale its neighboring cell measurements on this basis.

For example, if the UE 106 has become substantially stationary (such as if a user of the UE 106 is sitting in an office or at home), it may be unlikely that re-selection to a neighboring cell may become beneficial, even if the serving cell only provides marginal service: since location may be a significant factor in the cell conditions experienced by the UE 106, if location of the UE 106 is not changing, it may be unlikely that neighboring cells will improve sufficiently and/or that the serving cell will degrade sufficiently as to cause cell re-selection to be desirable. Thus, the rate at which (at least some) neighboring cell measurements are performed may be reduced (scaled down) if the UE 106 is substantially stationary. If the UE 106 is rapidly moving, however, it may be the case that imminent cell re-selection may be likely, for example if distance from the serving cell is increasing rapidly (and thus potentially losing signal strength/quality) while distance from an upcoming neighboring cell is decreasing rapidly (and thus potentially gaining signal strength/quality). In this case, it might be desirable to increase (scale up) the frequency with which (at least some) neighboring cell measurements are performed, e.g., in order to ensure timely and effective cell re-selection and continuity of service are provided even under highly mobile conditions.

Note that determinations of substantially stationary conditions and substantially mobile conditions (and possibly further refinements for varying degrees of mobility) may be made in any of various ways, as desired. As one example, a Doppler estimation of less than 5 Hz (or 4 Hz, 6 Hz, 8 Hz, or any other value) might be considered indicative of stationary conditions, while a Doppler estimation of greater than 5 Hz (or 4 Hz, 6 Hz, 8 Hz, or any other value) might be considered indicative of mobile conditions. Other ways of defining substantially stationary and substantially mobile conditions are also possible.

Further considerations that may be used to adaptively determine neighboring cell measurement scaling factors could include CRC errors from previous DRX cycles, residual frequency and timing tracking errors, etc. For example, if errors of one or more type have recently been experienced, it may be desirable to increase the frequency (or at least return to a normal frequency) with which at least some neighboring cell measurements are performed, since the errors may be indicative of degraded radio conditions between the UE 106 and its serving cell, which might in turn suggest that cell re-selection would be desirable.

In 510, neighboring cell measurements may be performed using adaptive scaling. In other words, the UE 106 may perform its neighboring cell measurements during the active portion of the idle-mode DRX cycle based on the adaptive neighboring cell measurement scaling configuration determined in step 508. Thus, in each respective DRX cycle, cell measurements may be performed on those cells for which cell measurements are scheduled according to their assigned scaling factor(s), while no cell measurements may be performed on other neighboring cells which are not scheduled for cell measurements in a respective DRX cycle.

Note that given such an adaptive neighboring cell measurement scaling configuration, it may be possible that few (or no) neighboring cell measurements may be performed in any given DRX cycle. For example, if it is adaptively determined to scale all neighboring cell measurements such that they are performed every second (or third, or fourth, etc.) DRX cycle, cell measurements may be performed on the neighboring cells only every second (or third, or fourth, etc.) DRX cycle. As another possibility, cell measurements might be performed on some neighboring cells (e.g., those determined to be more relevant) relatively frequently (e.g., every DRX cycle, every second DRX cycle, two out of every three DRX cycles, etc.), while measurements might be performed on other neighboring cells (e.g., those determined to be less relevant) relatively infrequently (e.g., every third DRX cycle, every fourth DRX cycle, two out of every five DRX cycles, etc.). Thus, depending on how many different scaling factors are assigned at any given time, how many neighboring cells there are to be measured, etc., different numbers of neighboring cells might be measured in different DRX cycles.

Note that cell measurement frequency on any given cell may be scaled differently at different times, e.g., based on different conditions. In other words, cell measurement scaling may be modified in a manner adaptive to conditions experienced by the UE 106. For example, it may at one time be determined to perform cell measurements on a particular neighboring cell according to a first scaling factor (e.g., reducing the frequency at which measurements on that particular cell are performed by the first scaling factor), but at another time, it may be determined to perform cell measurements on that particular neighboring cell according to a second (different) scaling factor, or without applying a scaling factor at all (e.g., according to a default configuration).

As a specific example of one possible implementation of adaptive scaling of neighboring cell measurements, consider a UE 106 which observes a set ("Cset") of cells that includes all possible neighboring cells which the UE 106 can measure and evaluate; let the number of cells in this set be $N_{Cset}$. A subset ("Pset") of Cset could include the strongest $N_{Pset}$ cells observed by the UE 106. Note that in this case $N_{Cset}$ may be greater than $N_{Pset}$.

Given these two sets Cset and Pset, different scaling factors could be assigned to each set. Thus a periodicity scaling of $T_{Cset}$ could be applied to Cset, while a periodicity scaling of $T_{Pset}$ could be applied to Pset. In this case $T_{Cset}$ may be greater than $T_{Pset}$ (e.g., measurements on Cset may be performed with a longer periodicity/less frequently than measurements on Pset). Thus the most relevant cells (e.g., those in Pset) may be measured relatively frequently, which may be sufficient to support good service levels and device performance, while the remaining cells (e.g., which may be included in Cset) may still be occasionally measured, but less frequently, which may reduce power consumption and thus potentially extend device battery life. Note that the cells in Pset may be dynamically adjusted based on any of various adaptive rules, such as those described hereinabove, such that the cells selected to be in Pset may remain the most relevant even under changing conditions.

Note that in the above-provided exemplary implementation, the number of cells in the Pset may be static (e.g., a set number of cells, such as the $N_{Pset}$ highest ranked neighboring cells according to signal strength or any other desired ranking criteria) or dynamic (e.g., any number of cells which meet certain predetermined criteria, such as however many of the neighboring cells which have a signal strength or any other desired characteristic value above a predetermined threshold). Furthermore, numerous variations on and alternatives to the above-provided exemplary implementation are also possible, including implementations in which different numbers of sets are defined, whose members are determined according to any of various adaptive rules, which may have overlapping or exclusive membership, and for which different periodicity scaling factors may be applied. As previously noted, measurement of some or all neighboring cells may further be scaled on an individual basis if desired.

It should be noted that if desired, certain device-specific hardware or software features may be considered in selecting an adaptive neighboring cell measurement scaling configuration. For example, some devices may be hard-configured to perform up to a certain number of cell measurements at a time. For example, neighboring cell measurements might be performed in groups of up to 8 (or any other number of) cells. In this case, if cell measurements are scheduled for 4 neighboring cells, it would take an equal amount of time to perform those measurements as it would to perform cell measurements on 8 neighboring cells. In contrast, it would take twice as long to perform 9 neighboring cell measurements as it would to perform cell measurements on 8 neighboring cells. Thus, in such a configuration, it may be most efficient to group neighboring cells into sets which have a number of members which is a multiple of 8. For example, referring back to the above-described exemplary implementation, it might be desirable to define $N_{Pset}$ (i.e., the number of cells in Pset) as 8 or 16 if device hardware is configured to perform neighboring cell measurements in groups of up to 8. As another example, it might be desirable to define $N_{Pset}$ (i.e., the number of cells in Pset) as 6 or 12 if device hardware is configured to perform neighboring cell measurements in groups of up to 6. Other device-specific hardware or software features may alternatively or additionally be considered.

In 512, cell re-selection may be performed. Note that this step may not be performed in every DRX cycle. In particular, at least in some implementations, cell re-selection may be performed only if certain cell re-selection criteria are met. Cell re-selection may, for example, be desirable if the serving cell has degraded (e.g., in signal strength and/or quality) and/or if a neighboring cell has improved (e.g., similarly, in signal strength and/or quality) such that the neighboring cell may likely provide better service than the current serving cell. Cell re-selection may thus depend significantly on serving and neighboring cell measurements, such as those performed in step 510 using adaptive neighboring cell measurement scaling. If it is determined (e.g., based on the serving and neighboring cell measurements performed in step 510) that cell re-selection to a neighboring cell is desired, the UE 106 may reselect to that neighboring cell, which may thus become the new serving cell of the UE 106.

In 514, the UE 106 may sleep. In other words, having completed all scheduled operations for the active portion of the idle-mode DRX cycle, the UE 106 may transition from the waking or active portion of the DRX operation back to the sleeping or inactive portion of the DRX operation.

Note that the method may be performed in a repeating (iterative) manner. In particular, one iteration of the method may correspond to one idle-mode DRX cycle. Thus, a UE 106 which performs multiple DRX cycles over a period of time (e.g., while in standby, in order to maintain a minimal cellular connection) may correspondingly repeat the method of FIG. 5 (with various steps potentially performed in a different manner in some or all DRX cycles, e.g., depending on whether any paging messages are received, which neighboring cells are measured according to the adaptive neighboring cell measurement scaling configuration, whether or not cell re-selection is performed, etc.) multiple times. Note that at least in some cases, determination of neighboring cell measurement scaling factors may not be performed in every DRX cycle; for example, it might be the case that once selected, a neighboring cell measurement scaling factor (or factors) may be used for a certain (e.g., predetermined or adaptively determined) number of DRX cycles, after which a new neighboring cell measurement scaling factor (or factors) may be selected, e.g., based on updated conditions, and used for a subsequent number of DRX cycles.

Thus, by adaptively scaling neighboring cell measurements in idle-mode DRX, a UE 106 may be able to reduce the average amount of time spent awake in each DRX cycle (e.g., by avoiding performing neighboring cell measurements on at least some cells during at least some DRX cycles, thus reducing the amount of time spent awake in any such DRX cycles), which may in turn improve battery life of the UE 106. For example, if the waking time of a UE 106 were reduced from 6 ms to 4 ms by deferring some or all neighboring cell measurements in a particular DRX cycle, the battery consumption of the UE 106 might be reduced by approximately 33% over the course of that particular DRX cycle. Note that numerous other amounts of, and differences between, waking times with and without the use of adaptive scaling of neighboring cell measurements are also possible, and the above example is provided for illustrative purposes only.

Furthermore, the method may be particularly impactful in cellular systems with relatively high cell density (such as may be typical in TD-SCDMA, TD-LTE, and other TD-based cellular technologies). For example, the impact on power consumption of reducing the frequency at which neighboring cell measurements are performed on at least a portion of those neighboring cells, at least some of the time, may be increased in such systems because the high cell density may directly result in a greater number of neighboring cells to potentially measure and evaluate relative to other systems. An even further synergistic effect of implementing such a method in a TD-based system may advantageously be obtained if quantitative understanding of the serving and/or neighboring cells gained from joint detection algorithms are leveraged to improve the effectiveness of evaluating and determining an appropriate scaling factor for some or all neighboring cells.

While reducing the frequency of some neighboring cell measurements, and hence increasing the length of time between performing cell measurements on those cells, may decrease the amount of processing time during the waking period of at least some DRX cycles, it should be noted that the potential for a higher mis-detection rate and greater odds of a radio link failure may also increase. However, if such a method is intelligently implemented (e.g., if the characteristics used to adaptively determine scaling factors for different neighboring cells and/or groups of neighboring cells are intelligently chosen and configured), a significant upside in terms of reduced battery consumption may be obtained while experiencing only a minimal downside in terms of increased risk of radio link failure.

Figure 6:
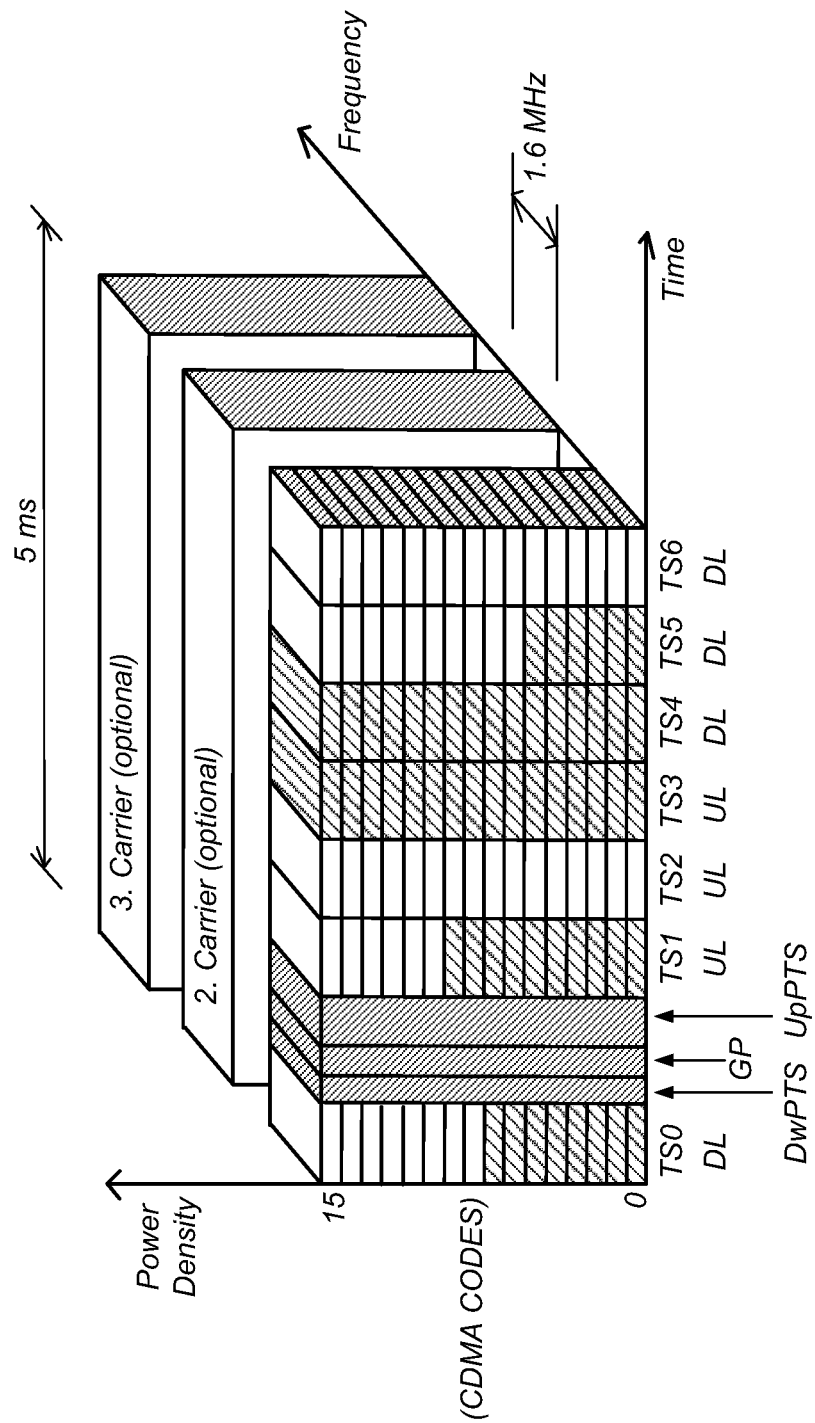
FIG. 6 is a graph illustrating aspects of a TD-SCDMA cellular system.

FIG. 6—Exemplary TD-SCMA Cellular Wireless System

FIG. 6 is a high-level diagram illustrating characteristics of a TD-SCMA cellular wireless system in which some or all of the features of the method of FIG. 5 may be implemented. It should be noted, however, that while the system of FIG. 6 represents one possible system in which the features of the method of FIG. 5 may be implemented, such features may also or alternatively be implemented in numerous other possible systems. Accordingly, it should be recognized that FIG. 6 and the description provided herein below with respect thereto, are provided by way of example only, and are not intended to be limiting to the disclosure as a whole.

The system may provide multiple access features in two and possibly three dimensions. As shown in the vertical axis, increasing power density may enable an increasing number of CDMA codes to be layered into each given uplink or downlink transmission; thus, different users may be provided with different CDMA codes and thus may be provided with simultaneous cellular service (e.g., by a serving cell).

Further, as shown in the horizontal axis, multiple timeslots may be defined. Different users may be assigned the use of different timeslots, thus adding a further multiple-access dimension. As shown, in a TD-SCMA system, a first timeslot may be a downlink timeslot. Subsequent timeslots may be assigned as uplink or downlink timeslots as desired, but as shown, for a transition from a downlink timeslot to an uplink timeslot, a downlink pilot timeslot, a guard period, and an uplink pilot timeslot may be utilized, e.g., in order to account for interface (transmission time) delays.

If desired, a further multiple access dimension may be provided by defining and utilizing multiple carrier frequencies, as shown in the depth axis. In TD-SCDMA, each carrier may be 1.6 MHz wide, as shown. Note, however, that it may also be possible to implement TD-SCDMA using a single carrier frequency.

TD-SCDMA systems may be synchronous, meaning all cells in the system may be synchronized. Note also that TD-SCDMA systems may (at least in some instances) also utilize joint detection algorithms for interference management. Further details regarding joint detection algorithms are provided herein below with respect to FIG. 7.

Figure 7:
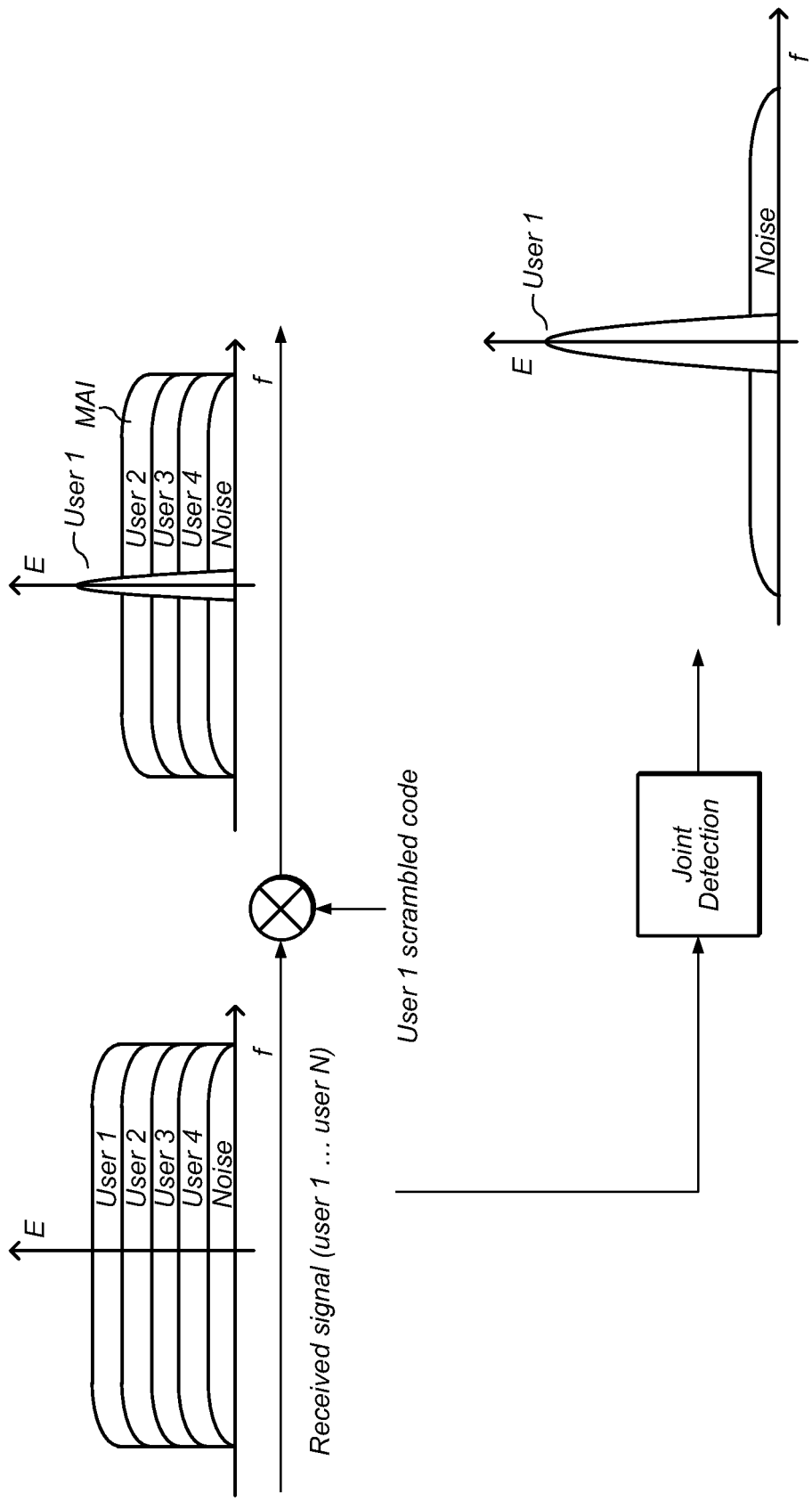
FIG. 7 illustrates aspects of signal reception with and without joint detection.

FIG. 7—Joint Detection Algorithm

FIG. 7 is a high-level diagram illustrating characteristics of a joint detection algorithm which may be used to reduce or eliminate multiple access interference (MAI), particularly in a CDMA based system. Such algorithms may be used in conjunction with some or all of the features of the method of FIG. 5. It should be noted, however, that while the system of FIG. 7 illustrates some possible characteristics and features of joint detection algorithms, numerous other features and characteristics may also or alternatively be implemented if desired. Accordingly, it should be recognized that FIG. 7 and the description provided herein below with respect thereto, are provided by way of example only, and are not intended to be limiting to the disclosure as a whole.

FIG. 7 particularly illustrates aspects of how a user device might receive a signal having multiple access interference with and without joint detection. As shown, a signal may be received by a user device ("user 1"), which may include traffic streams intended for each of multiple other user devices ("user 2", "user 3", "user 4"), in addition to some noise ("noise") which is not a result of a CDMA multiple access scheme. If the user device simply decodes the user 1 portion of the signal with the user 1 scrambling code and without joint detection, the user device may see the MAI from users 2-4 as indistinguishable from and additive with the non-MAI noise. As a result, the user device may see a low SNR.

However, as shown, if the user device utilizes a joint detection algorithm on the received signal, the user device may be able to actively cancel the portions of the signal which are intended for users 2-4. The user device may be able to do so by simultaneously extracting all CDMA signals through parallel processing of the individual traffic streams (e.g., using the specific spreading codes for each user) and cancelling the signals for the other users. Thus, as a result, the user device may see a high SNR, since all (or substantially all) of the MAI may have been cancelled by the joint detection algorithm, resulting in only the non-MAI noise being present after execution of the joint detection algorithm.

FIG. 8—TD-SCDMA Idle DRX Measurement and Evaluation Table

FIG. 8 is a table illustrating exemplary permissible neighboring cell measurement and evaluation parameters according to one possible TD-SCDMA cellular wireless system in which some or all of the features of the method of FIG. 5 may be implemented. It should be noted, however, that while the exemplary permissible parameters of FIG. 8 may represent one possible such set, the features of the method of FIG. 5 may alternatively be implemented against the backdrop of any number of different sets of permissible neighboring cell measurement and evaluation parameters, and as previously noted, in conjunction with entirely different cellular technologies. Accordingly, it should be recognized that FIG. 8 and the description provided herein below with respect thereto, are provided by way of example only, and are not intended to be limiting to the disclosure as a whole.

Each row of the exemplary table illustrated in FIG. 8 may correspond to one set of permissible idle DRX measurement and evaluation parameters according to the exemplary TD-SCDMA system. Thus, as shown, for each of various DRX cycle lengths, neighboring cell measurements and evaluations may be specified at various intervals. More specifically, different types of neighboring cells (e.g., potentially including cells which operate according to different cellular technologies) may be measured and/or evaluated at different frequencies. Thus, for example, for a DRX cycle length of 1.28s, it may be specified that measurement of most types of neighboring cells should occur every 1.28s (every DRX cycle), but measurement of GSM cells should occur every 6.4s (every 5 DRX cycles).

With such specifications as a basis, adaptive neighboring cell measurement scaling, such as might be performed according to the various features described herein with respect to FIG. 5, might be implemented in order to improve the energy efficiency of a device's idle DRX operation. In particular, a device might determine that for a particular neighboring cell or group of cells, instead of the default behavior (e.g., measuring cell characteristics every DRX cycle), cell measurements could be scaled by a scaling factor (e.g., performed at a rate less frequent than the default rate, such as every other DRX cycle with a scaling factor of ½, or every third DRX cycle with a scaling factor of ⅓). Thus, since fewer cell measurements would be performed during those DRX cycles in which certain cells are not scheduled for measurement due to the adaptive scaling configuration, less time may be spent awake in those DRX cycles, which may directly reduce the amount of power consumed by the device.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for operating a wireless user equipment (UE) device according to idle-mode discontinuous reception (DRX) in a time-division multiple access (TDMA) cellular communication system, the method comprising:
   operating alternately in active and inactive states in a periodic manner according to DRX cycle timing for each of a plurality of DRX cycles;
   checking for paging messages while in the active state during each DRX cycle;

decoding a paging message received while in the active state during at least one DRX cycle, wherein said decoding utilizes a joint detection technique for multiple access interference (MAI) cancellation;
adaptively determining whether or not to perform cell measurements on each of a plurality of neighboring cells while in the active state during at least a subset of the plurality of DRX cycles, wherein said adaptively determining is based at least in part on cell characteristics of neighboring cells determined by utilizing the joint detection technique to decode paging messages; and
wherein during the active state of at least one DRX cycle, said adaptively determining is based on cell characteristics determined by utilizing the joint detection technique to decode a paging message received during the same DRX cycle;
performing neighboring cell measurements while in the active state during at least a subset of the plurality of DRX cycles, wherein the neighboring cell measurements are performed based on adaptively determining whether or not to perform cell measurements on each of the plurality of neighboring cells.

2. The method of claim 1,
wherein said adaptively determining is further based at least in part on one or more previous cell measurements.

3. The method of claim 1,
wherein said adaptively determining is further based at least in part on an amount of motion of the UE.

4. The method of claim 1,
wherein said adaptively determining is further based at least in part on a difference in one or more physical layer indicators of cell strength between a serving cell and a strongest neighboring cell.

5. The method of claim 1,
wherein said adaptively determining is further based at least in part on a signal to noise ratio of a serving cell.

6. The method of claim 1,
wherein said adaptively determining is further based at least in part on one or more signal to noise ratios of the plurality of neighboring cells.

7. The method of claim 1,
wherein said adaptively determining is further based at least in part on a change in a signal to noise ratio of a serving cell.

8. The method of claim 1,
wherein said adaptively determining is further based at least in part on a change in one or more signal to noise ratios of the plurality of neighboring cells.

9. A wireless user equipment (UE) device, the UE comprising:
a radio, comprising one or more antennas for performing wireless communication;
a processing element operably coupled to the radio;
wherein the radio and the processing element are configured to:
operate according to idle-mode discontinuous reception (DRX), wherein said operating comprises operating alternately in active and inactive states in a periodic manner according to DRX cycle timing for each of a plurality of DRX cycles;
establish a wireless link with a first base station, wherein the first base station acts as a serving cell for the UE;
receive an indication of a plurality of neighboring cells from the first base station;
designate at least one subset of the plurality of neighboring cells;
determine a frequency at which to perform cell measurements on the at least one subset of the plurality of neighboring cells, wherein the determined frequency is different than a frequency at which cell measurements are performed on other cells of the plurality of neighboring cells;
designate the at least one subset of the plurality of neighboring cells and determine the frequency at which to perform cell measurements on the at least one subset of the plurality of neighboring cells based at least in part on cell characteristics of neighboring cells determined from decoding a paging message during an active state of a first DRX cycle using a joint detection technique for multiple access interference (MAI) cancellation;
perform cell measurements on the at least one subset of the plurality of neighboring cells according to the determined frequency during at least the active state of the first DRX cycle.

10. The UE of claim 9,
wherein the cell measurements are performed on the at least one subset of the plurality of neighboring cells as part of a discontinuous reception (DRX) mode of operation of the UE,
wherein the frequency at which to perform cell measurements on the at least one subset of the plurality of neighboring cells specifies a proportion of DRX cycles in which to perform cell measurements on the at least one subset of the plurality of neighboring cells.

11. The UE of claim 10,
wherein the frequency at which to perform cell measurements on the at least one subset of the plurality of neighboring cells is determined based at least in part on cell characteristics determined during previous DRX cycles.

12. The UE of claim 9,
wherein the frequency at which to perform cell measurements on the at least one subset of the plurality of neighboring cells is determined based at least in part on an amount of motion of the UE.

13. A non-transitory computer accessible memory medium
comprising program instructions for a wireless user equipment (UE) device to adaptively scale neighboring cell measurements, wherein the program instructions are executable by a processor to:
operate according to idle-mode discontinuous reception (DRX), wherein said operating comprises operating alternately in active and inactive states in a periodic manner according to DRX cycle timing for each of a plurality of DRX cycles;
establish a wireless link with a first base station, wherein the first base station acts as a serving cell for the UE;
receive an indication of a plurality of neighboring cells from the first base station;
select a first scaling factor to apply to a first group of cells comprised in the plurality of neighboring cells, wherein the first scaling factor comprises a factor by which frequency of cell measurements is reduced for the first group of cells;
select the first scaling factor based at least in part on cell characteristics of neighboring cells determined from decoding a paging message during an active state of a first DRX cycle using a joint detection technique for multiple access interference (MAI) reduction;

select a second scaling factor to apply to a second group of cells comprised in the plurality of neighboring cells, wherein the second scaling factor comprises a factor by which frequency of cell measurements is reduced for the second group of cells, wherein the second scaling factor is different than the first scaling factor;

perform cell measurements on the first group of cells according to the first scaling factor during an active state of at least the first DRX cycle; and perform cell measurements on the second group of cells according to the second scaling factor during at least the active state of the first DRX cycle.

14. The memory medium of claim 13, wherein the program instructions are further executable to:

communicate with the first base station according to a discontinuous reception (DRX) mode of operation, wherein the cell measurements on the first group of cells and on the second group of cells are performed during active portions of DRX cycles while communicating with the first base station according to the DRX mode of operation, wherein the first scaling factor specifies a proportion of DRX cycles in which to perform the cell measurements on the first group of cells, wherein the second scaling factor specifies a proportion of DRX cycles in which to perform the cell measurements on the second group of cells.

15. The memory medium of claim 14, wherein the program instructions are further executable to:

select the first scaling factor and the second scaling factor during a first DRX cycle based on cell characteristics of the first group of cells and the second group of cells determined previously during the first DRX cycle.

16. The memory medium of claim 13, wherein the program instructions are further executable to:

modify membership of one or more of the first group of cells or the second group of cells.

17. The memory medium of claim 16, wherein membership of one or more of the first group of cells or the second group of cells is modified based on changes in one or more of signal strength or signal to noise ratio of one or more cells comprised in the plurality of neighboring cells.

18. The memory medium of claim 16, wherein membership of one or more of the first group of cells or the second group of cells is modified based on one or more of signal strength or signal to noise ratio of the serving cell.

19. The memory medium of claim 16, wherein membership of one or more of the first group of cells or the second group of cells is modified based on a detected amount of motion of the UE.

* * * * *